(12) United States Patent
Krogman et al.

(10) Patent No.: US 8,277,899 B2
(45) Date of Patent: Oct. 2, 2012

(54) POROUS FILMS BY BACKFILLING WITH REACTIVE COMPOUNDS

(75) Inventors: Kevin Krogman, Santa Clara, CA (US); David Olmeijer, San Francisco, CA (US); Rajul Shah, Fremont, CA (US); Benjamin Wang, Mountain View, CA (US)

(73) Assignee: Svaya Nanotechnologies, Inc., Sunnyvale, CA (US)

( * ) Notice: Subject to any disclaimer, the term of this patent is extended or adjusted under 35 U.S.C. 154(b) by 0 days.

(21) Appl. No.: 13/294,115

(22) Filed: Nov. 10, 2011

(65) Prior Publication Data

US 2012/0148829 A1 Jun. 14, 2012

Related U.S. Application Data

(60) Provisional application No. 61/423,032, filed on Dec. 14, 2010.

(51) Int. Cl.
*B05D 3/02* (2006.01)
(52) U.S. Cl. ........... 427/385.5; 427/348; 427/379; 427/384; 427/389.7; 427/393.5; 427/421.1; 427/427.4
(58) Field of Classification Search ............ None
See application file for complete search history.

(56) References Cited

U.S. PATENT DOCUMENTS

| | | | |
|---|---|---|---|
| 5,627,082 A | 5/1997 | Beratan et al. | |
| 5,716,709 A * | 2/1998 | Ferguson et al. | 428/420 |
| 5,925,228 A | 7/1999 | Panitz et al. | |
| 6,402,876 B1 | 6/2002 | McArdle et al. | |
| 6,465,044 B1 | 10/2002 | Jain et al. | |
| 7,001,568 B2 | 2/2006 | Wang et al. | |
| 7,201,022 B2 | 4/2007 | Zesch et al. | |
| 7,957,621 B2 | 6/2011 | Zhang et al. | |
| 2006/0062982 A1 * | 3/2006 | Hammond Cunningham et al. | 428/220 |
| 2010/0159366 A1 * | 6/2010 | Shao-Horn et al. | 429/532 |

FOREIGN PATENT DOCUMENTS

| | | |
|---|---|---|
| GB | 2 198 739 A | 6/1988 |
| JP | 4 197427 A | 7/1992 |
| JP | 2008 041377 A | 2/2008 |

OTHER PUBLICATIONS

Kleinfeld et al, Science 265, pp. 370-373, 1994.*
Gemici, et al. (2009) "Targeted Functionalization of Nanoparticle Thin Films via Capillary Condensation" Nano. Lett 9 (3):1064-1070.
Rouse, et al. (2000) "Sol-Gel Processing of Ordered Multilayers to Produce Composite Films of Controlled Thickness" Chem. Mater. 12(8):2502-2507.
International Search Report and Written Opinion, PCT/US2011/064397, dated Jun 6, 2012.

* cited by examiner

*Primary Examiner* — Erma Cameron
(74) *Attorney, Agent, or Firm* — Isaac Rutenberg; Richard Aron Osman

(57) ABSTRACT

The invention provides methods for modifying one or more properties of porous thin films. In such methods, a formulation comprising a reactive species is applied to the porous thin film and allowed to crosslink. In some embodiments, the crosslinked network thus formed imparts increased mechanical strength and wear resistance to the porous thin films.

24 Claims, 1 Drawing Sheet

POROUS FILMS BY BACKFILLING WITH REACTIVE COMPOUNDS

CROSS-REFERENCE TO RELATED APPLICATIONS

This application claims priority under 35 U.S.C. §119(e)(1) to U.S. Provisional Patent Application Ser. No. 61/423,032, filed Dec. 14, 2010, the contents of which are incorporated herein by reference.

BACKGROUND

Porous thin films are widely used as optical filters, anti-reflection coatings, anti-fog surfaces, sensors, dielectrics and heat transfer surfaces. Typically, porous thin films contain air in the void regions, and such air-filled voids influence the properties of the films. For example, applications for porous films include dielectrics where the presence of air in the voids increases the composite dielectric constant. Porous thin films also provide for a volume, where air can be replaced by an alternative fluid. In the case of nanoporous thin films, where the typical size of a pore is smaller than a quarter wave of incident light, an anti-fog film can be produced. In other cases, liquid crystals, drugs, or dyes can also be interred into the porous film.

Porous thin films can be fabricated from vacuum based processes (e.g., chemical vapor deposition), created from sol-gel processes, electrostatic spray processes or assembled from nanoparticle solutions. Recently, complex porous thin films have been assembled from nanoparticle suspensions using a thin film technique called "layer-by-layer assembly" with wide flexibility over film morphology and composition as well as substrate shape and composition. The process creates films by taking advantage of self-limiting complementary interactions, such as electrostatic pairs or hydrogen bonding donors and acceptors. A major drawback of the technique however arises from the nature of the complementary interactions used to assemble the film which do not provide significant mechanical or environmental strength for many applications, such as optics.

A number of techniques have been investigated to improve the mechanical robustness of porous thin films. Chemical crosslinking, such as the thermally induced formation of amide bonds between carboxylic acid and amine functionalities, has been widely used but has demonstrated insufficient abrasion resistance for medium wear applications. Other post processing treatments such as thermal calcination or hydrothermal treatments have improved wear resistance but also to a limited degree. U.S. Pat. No. 5,925,228 describes a method for filling cracks and defects in dielectric, ceramic, and semiconductor coatings using electrophoretically active sol-gel preparations, but does not describe how to preferentially fill the pores over the surface.

To date, there has been little to no evidence that porous thin films from the layer by layer technique can survive the durability requirements needed for commercial applications. There is a need in the art for a method of significantly improving the mechanical properties of these films, while simultaneously maintaining the desired functional properties and advantages of porous thin films. Ideal methods and materials would exhibit one or more of the following advantages: utilize inexpensive and readily available materials; be applicable to a wide variety of porous thin films without preference for any particular film-forming method; lead to significantly enhanced film properties such as wear/abrasion resistance and toughness; and avoid causing significant degradation of desirable film properties such as transparency.

SUMMARY OF THE INVENTION

In some aspects, the present disclosure provides methods and materials for preparing coatings with enhanced durability and functionality. In particular, the present disclosure provides methods and materials for improving the properties of porous thin films.

In some aspects, it is the object of this disclosure to provide materials and methods to increase the mechanical, chemical and/or environmental wear resistance of porous thin films.

In some aspects, the disclosure provides methods to increase the mechanical, chemical and/or environmental wear resistance of porous thin films which contain more than a single material.

In some aspects, the disclosure provides methods which control the degree of porosity of thin films.

In some aspects, the disclosure provides methods for adding functional properties to porous thin films. Examples of such functional properties include wettability, optical, anti-microbial, sensing, reactivity, up-conversion, down-conversion, and absorption of radiation.

In some aspects, the disclosure provides the above mentioned objectives while maintaining the uniformity of the porous thin films.

In some aspects, the disclosure provides the above mentioned objectives while maintaining the thickness of the porous thin films.

In some aspects, the disclosure provides methods for creating materials which improve the mechanical, chemical and/or environmental wear resistance of porous thin films.

In some aspects, the disclosure provides methods for applying reactive formulations and removing excess reactive formulations from the surface of porous thin films. In some aspects, the disclosure provides methods for inducing a reaction in the reactive formulation using thermal, radiative or chemical stimulus.

An embodiment of interest is the use of layer by layer (LbL) assembled films as templates for using reactive formations to create highly uniform films having robust mechanical properties. In some embodiments, the LbL film is a porous film, and comprises an interconnected network of pores (i.e., an open pore structure).

A further embodiment of interest is a method for controllably introducing a reactive formulation into a porous film, wherein the reactive formulation can form a solid phase upon application of external stimulus.

A further embodiment of interest is a method of applying a reactive formulation to a porous film disposed on a substrate.

In some aspects, the disclosure provides a method for modifying a property of a porous film, the method comprising: applying a filling solution comprising a reactive species and optionally a solvent to the surface of the porous thin film; allowing the solution to remain in contact with the porous film for a period of time sufficient to allow the reactive species to imbibe into the pores of the porous thin film; and applying a crosslinking stimulus to the porous film to cause initiation of crosslinking, or allowing sufficient time for auto-initiation of crosslinking, of the reactive species imbibed in the pores of the porous thin film.

In some aspects, the disclosure provides a method for preparing a semi-porous film on a substrate, the method comprising: providing a film disposed on the substrate, wherein the film has a first degree of porosity; contacting a surface of the porous film with a solution comprising a reactive species and optionally comprising a solvent for a time sufficient to allow reactive species to diffuse into the pores of the film; optionally removing excess solution from the surface of the film; and reacting the reactive species in the pores of the film to form a crosslinked interpenetrating network within the pores of the film.

In some aspects, the disclosure provides a film on a substrate comprising: a plurality of nanoparticles of a first type arranged to form a plurality of pores, wherein the nanoparticles of the first type are electrostatically charged; a filling material forming an interpenetrating crosslinked network within the pores formed by the nanoparticles of the first type.

In some aspects, the disclosure provides a method for modifying a property of a porous thin film, the method comprising: applying a filling solution to the surface of the porous thin film, wherein the filling solution comprises a reactive species; and allowing the solution to remain in contact with the porous film for a predetermined period of time.

In some aspects, the disclosure provides a method for modifying a property of a porous thin film, the method comprising: contacting the surface of the porous thin film with a solution comprising a solvent and a reactive species; allowing the porous film to imbibe the reactive species; removing any excess solution from the surface of the porous thin film; and reacting the imbibed reactive species.

In some aspects, the disclosure provides a method for preparing a semi-porous thin film on a substrate, the method comprising: providing a thin film disposed on the substrate, wherein the thin film has a first degree of porosity; contacting a surface of the porous thin film with a solution comprising a reactive species for a time sufficient to allow reactive species to diffuse into the pores of the thin film; optionally removing excess solution from the surface of the thin film; and reacting the reactive species in the pores of the thin film to form a crosslinked network interpenetrating the thin film, wherein the thin film with interpenetrating crosslinked network has a second degree of porosity that is less than the first degree of porosity.

In some aspects, the disclosure provides a thin film prepared according to any of the embodiments presented herein.

In some aspects, the disclosure provides a thin film on a substrate comprising: (a) a first material comprising a plurality of nanoparticles and having an electrostatic charge; (b) a second material comprising a binding material and having an electrostatic charge opposite that of the first material; (c) a third material, wherein the third material is crosslinked and is disposed within voids created by the first and second materials.

In some aspects, the disclosure provides a thin film comprising: a plurality of bilayers having an open-pore structure and comprising alternating layers of a first material and a second material, wherein the first and second materials have opposite electrostatic charges; and a third material, wherein the third material is disposed within the pores of the bilayer and is crosslinked.

In some aspects, the disclosure provides a method for reducing the porosity of a porous thin film, the method comprising: applying a filling solution to the surface of the porous thin film, wherein the filling solution comprises a reactive species and a solvent; allowing the solution to remain in contact with the porous film for a period of time sufficient to allow association of reactive species with the porous thin film; optionally removing excess solution from the surface of the porous thin film; and curing the porous thin film under conditions sufficient to crosslink the reactive species associated with the porous thin film.

These and other aspects of the invention will be apparent from the disclosure provided herein, including the examples and claims.

DETAILED DESCRIPTION OF THE INVENTION

Figure 1:
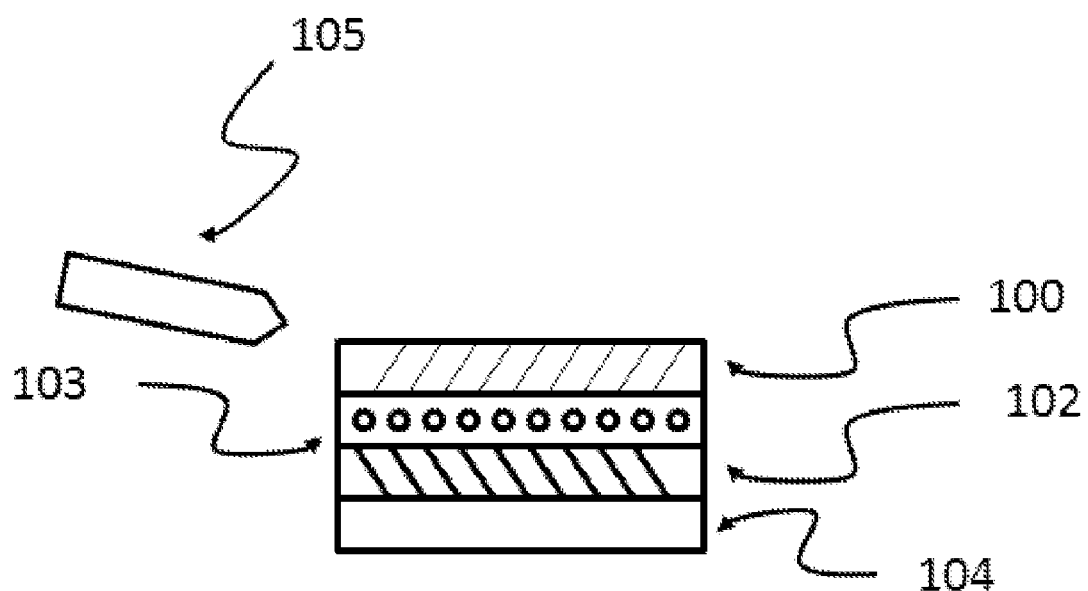
FIG. 1 provides a schematic diagram of an apparatus for removing excess liquid from film surfaces.

Unless otherwise indicated, the disclosure is not limited to specific procedures, materials, or the like, as such may vary. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "a reactive species" includes not only a single reactive species but also a combination or mixture of two or more different reactive species.

As used herein, the term "porous" as in a "porous material" refers to a material containing voids, whether such voids are filled with another material or unfilled. That is, a porous material may contain voids that are unfilled (or, more likely, filled with an ambient gas such as air), partially filled with a pore-filling material, or completely filled with a pore-filling material.

In some embodiments, the methods of the invention involve creating a continuous crosslinked network within a porous film by filling the pores of the porous film with a reactive liquid formulation capable of creating a covalently connected continuous network upon subsequent reaction. This process of filling of the pores also provides for the possibility of a chemical reaction between the reactive formulation and the porous film's super structure. Accordingly, the methods comprise filling pores of a porous film with a reactive material and reacting the material to form a network, wherein the reacting involves: (1) self-condensation of molecules of reactive material; (2) molecules of reactive material reacting with one or more components of the porous film; or (3) both (1) and (2). Examples of the components of the porous film that may react with the reactive material include nanoparticles (i.e., reactive groups located on the surface of nanoparticles) and polyelectrolytes. Uncontrolled filling of the pores can result in the loss of all functional porosity, nonuniform filling, and/or the presence of residual material on the surface leading to increased surface roughness. Such outcomes may be undesirable; accordingly, the methods of the invention involve controllably filling the pores of porous films to obtain desirable film properties. Using the methods disclosed herein, films are prepared that optimize the rigid, mechanically robust, continuous crosslinked network with a high degree of control over the uniformity of the film.

Accordingly, formulations in which the degree of filling can be tuned based on solution parameters are disclosed herein. In some embodiments, crosslinkable silane-based formulations which can be thermally cured are used to fill the pores of a porous film. For example, formulations of tetraethylorthosilicate (TEOS) in a suitable solvent (e.g., ethanol/water) are used. Upon application of heat or a change in the chemical environment, such as evaporation (i.e., an increase in concentration of the filling material) or the introduction/presence of acid or base, the silanes condense and form a covalently bonded continuous network of rigid silicon dioxide. Because water content controls the hydrolysis of ethoxy groups from TEOS and acid content controls the rate of condensation or polymerization of TEOS, a formulation according to the invention can be tuned to have different reactivity, viscosity, surface tension, and concentration and types of silane species in solution. These solution properties have an effect on various aspects of the methods, including the extent of filling, the preferred mode of inducing reaction, and the ease of removing excess solution from the film surface.

A corollary to the need to design the formulations such that the degree of filling can be controlled is that the control over the filling process is also dictated by the porous thin film morphology and the nature of the substrate. Thin film morphology is described by characteristics such as the size (and size distribution) of the pores, the volume fraction of the pores, the size (and size distribution), shape, composition and surface chemistry of nanoparticles or other solid phase network, and the thickness of the film. The substrate is described by characteristics such as composition, roughness, and shape. The methods of the invention account for these factors and provide methods for improving the properties of porous thin films. Furthermore, solution characteristics of the filling solution are considered in order to facilitate application of the solution to the thin films and removal of excess solution.

In some embodiments, the methods of interest involve applying a filling solution to a porous thin film. The filling solution comprises a reactive species and may further comprise additional components such as solvents, pH-modifying agents, viscosity-modifying agents, etc. Without wishing to be bound by theory, it is believed that the reactive species imbibes into the pores of the porous thin film.

In some embodiments, the methods of interest further include a step whereby excess filling solution is removed from the surface of the porous thin film.

In some embodiments, the methods of interest further include a curing step whereby the reactive species is cured (i.e., crosslinked or condensed) to form a continuous crosslinked network that interpenetrates the pores of the thin film.

Porous thin films such as those used in the methods described herein possess voids and may be freestanding films or may be coatings disposed on a substrate. Typically the voids contain air when in a dry state, although an inert gas (e.g., nitrogen, argon, etc.) or other gas may be present instead of air. When air is present in the pores, the porous films will often have refractive indices less than a similar film without porosity. Ultra thin films with a thickness of around 100 nanometers and a refractive index intermediate to that of air and the substrate may be used, for example, in creating antireflection films. Porous thin films also have a high degree of surface area compared with the film without porosity. This high degree of surface area can amplify sensitivity for sensing applications by providing additional surfaces for adsorption.

Typically, the porous thin films used in the invention are less than 10 microns in thickness, and may be less than 5 µm, or less than 3 µm, or less than 1 µm, or less than 500 nm, or less than 300 nm, or less than 100 nm, or less than 50 nm, or less than 25 nm in thickness. Typically such films are greater than 1 nm, and may be greater than 10 nm, or greater than 50 nm, or greater than 100 nm in thickness.

Porosity in the porous thin films may range from minimally porous films, having a porosity below 0.1, to highly porous films having a porosity of 0.5 or more, where porosity is defined as a volume fraction. For example, the porous thin films may have a porosity in the range 0.05 to 0.5, or between 0.1 and 0.4 or between 0.2 and 0.3. The porous thin films may have a porosity that is less than 0.5, or less than 0.4, or less than 0.3, or less than 0.2, or a porosity that is greater than 0.05, or greater than 0.1, or greater than 0.2, or greater than 0.3.

In some embodiments, the porous film comprises nanometer scale pores, and can be characterized as a nanoporous film. For example, in some embodiments, the porous film comprises pores that have an average diameter of less than 1 µm, or less than 750 nm, or less than 500 nm, or less than 250 nm.

The porous thin films can be made using chemical vapor deposition, sol-gel processes, electrostatic spray deposition, electrodeposition, spin coating, and many other techniques. In some embodiments, the porous thin films are prepared using a Layer-by-Layer (LbL) spray assembly process. In such embodiments, the resulting porous film is a multilayer film. The LbL process uses complementary interactions between molecules, such as electrostatic, covalent or hydrogen bonding interactions, to assemble films one molecular layer at a time. Using the example of electrostatic LbL, the process involves exposing a charged surface or a substrate (e.g., a substrate containing negative surface charges) to a first solution containing a charged molecule (e.g., a positively charged polyelectrolyte). The molecules of the solution have an affinity for the surface due to the presence of opposite surface charges. Molecules will continually assemble on the surface, resulting in film growth, until the charges available for binding are saturated, whereupon the surface undergoes a charge reversal, preventing further positively charged molecules from being adsorbed to the growing. Following the saturation of the surface, a rinse solution can be applied to the film, removing residual molecules that may be present or weakly interacting with the film, leaving behind a self-limited layer. A subsequent exposure of a second solution containing oppositely charged molecules (e.g., a negatively charged polyelectrolyte), will result in adsorption of the molecule from the second solution to the now positively charged surface until saturation occurs. Again, a rinse solution may be applied after the layer of negatively charged polyelectrolyte is completed. The resulting film comprising a layer of positively charged material and a layer of negatively charged material is known as a bilayer, and is the building block of an LbL film. The process of building a bilayer can be repeated to create a film consisting of multiple bilayers. The nature of the self-limiting process ensures control of film thickness and uniformity. Furthermore, in many cases, the thickness of the bilayer can be easily varied through changes in solution properties such as pH or salt concentration. Many molecules, solvents and methods of applications have been used in the pertinent LbL literature to create films with varied functionalities.

Porous thin films can be fabricated using LbL processing. Porous films using LbL can be made from polyelectrolytes including charged polymers and charged nanoparticles. Porous films made using LbL exhibit molecular scale control of film thickness, wide-area uniformity, flexibility in controlling porosity based on solution parameters, and flexibility in thin film composition based on choice of material used in each bilayer. In addition to other film morphology properties, the porosity of a porous thin film assembled via LbL can be tuned using many different parameters, including nanoparticle size and shape, polyelectrolyte type, solution pH and salt concentrations.

In some embodiments, the porous thin films are LbL-created films comprising nanoparticles. The nanoparticles can be homogeneous or can include two or more types of nanoparticles, differing in size, chemical makeup, shape, surface area, surface composition, etc. In some embodiments, the nanoparticles are formed from a material selected from oxides, sulfides, nitrides and zero valent forms of metals (such as silicon, titanium, aluminum, tin, zirconium, cerium, tungsten, vanadium, barium, gold, silver, copper, boron, and other metals or combinations thereof), as well as quantum dots, carbon nanotubes, graphene, and other nanoparticles or mixtures thereof. For example, in some embodiments metal oxides such as titanium dioxide, silicon dioxide, cerium dioxide, tin oxide, zirconium oxide, and the like (or similar nitrides or sulfides) are suitable. In some embodiments, the films comprise two or more different nanoparticles that vary in composition, shape, surface characteristics, and/or size (i.e., average size). In some embodiments, the porous thin films contain one or more polyelectrolytes such as poly(diallyldimethylammonium chloride) (PDAC), poly(allylamine hydrochloride (PAH), poly(sulfonated styrene) (PSS), poly(acrylic acid) (PAA), poly(ethylene imine), poly(vinyl alcohol), poly(ethylene oxide), polythiophenes, Nafion, biologically derived polyelectrolytes including chitosan, carboxymethylcellulose, polysaccharides, hyaluronic acid, and other polyelectrolytes, or copolymers of the abovementioned, known to those in the art.

In some embodiments, the porous film is made from an intrinsically electrically conducting material. In other embodiments the porous film is not electrically conducting (i.e. the porous film is made from an insulating material).

The porous thin films may comprise a plurality of bilayers. In some embodiments, the films comprise two or more bilayers (wherein, as described previously, each bilayer is composed of two layers having opposite charges), such as 2, 3, 4, 5, 6, 7, or more bilayers.

In some embodiments the porous thin film comprises first nanoparticles (i.e., nanoparticles of a first type) and second nanoparticles (i.e., nanoparticles of a second type) arranged so as to provide a porous film. The nanoparticles are different in material, size, shape, and/or polydispersity, or any combination thereof. The nanoparticles are deposited using a pair of deposition solutions. The first and second nanoparticles have complementary bonding moieties, such as opposite electrostatic charges. For example, the first type of nanoparticle is prepared from silica, and the second type of nanoparticle is prepared from titania or ceria.

The voids present in porous films which give rise to the above-mentioned functional properties also decrease the mechanical strength of the resulting films. Films prepared via LbL that are held together via electrostatic or hydrogen bonding interactions further exhibit weak mechanical, chemical and environmental robustness due to the lack of a continuous network of covalently connected materials. Accordingly, porous films in general and porous films prepared by LbL in particular are ideal materials for the methods disclosed herein. In such methods, mechanical and environmental robustness is enhanced and achieved using solutions of a reactive species as described herein.

Typically, the morphology of the porous thin film will be determined by a variety of factors. For example, in films comprising nanoparticles and polymers, the morphology may be influenced by the volume fraction of nanoparticle, polyelectrolyte, and air (i.e., void space) in the film. Morphology will also be influenced by the size (i.e., size distribution) and type (i.e., composition) of nanoparticles, the type (i.e., composition, molecular weight, etc.) of polyelectrolyte, and the thickness of the porous thin film. In some embodiments, the morphology of the porous film can be changed using processing techniques such as a thermal annealing. As described in more detail herein, the morphology of the thin film is a factor in determining suitable reactive species and filling solution properties.

In some embodiments, the porous film is preprocessed prior to imbibition of the filling solution (described below). In some such embodiments, the preprocessing includes calcination—i.e., heating the porous film to a temperature sufficient to pyrolyze any organic material such as a polymer polyelectrolyte, but insufficient to sinter the inorganic material present in the porous film. The calcination process may, for example, reorient inorganic nanoparticles (without sintering them) so as to form or re-form a porous film containing only the nanoparticles.

Substrate materials that are suitable for supporting the porous thin films used in the invention include metals (including semi-conductive and conductive metals, alloys, doped materials, etc.), plastics (including cross-linked and non-crosslinked polymers), ceramics, glass, composites, and combinations thereof. For example, suitable metals include titanium, copper, nickel, zinc, tin, lead, molybdenum, chromium, iron, silicon (including doped silicon), steel (including stainless steel, surgical steel, etc.), brass, and the like. Examples of plastics include acetate, PET, polycarbonate, polyethylene, and the like. The term "glass" is meant to include, for example, various grades and types of silica glass, borosilicate glass, borate glass, aluminosilicate glass, phosphate glass, and the like, as well as doped varieties of such materials. Composites include, for example, carbon fiber composites. Substrates are not limited to planar or flat geometries, and may include geometries such as curved, angular, rough, wavy, porous, etc. In some embodiments, the substrate is an electrically conducting material, and in other embodiments the substrate is not electrically conducting (i.e. the substrate is an insulator).

Substrates may include one or more coatings that reside between the substrate and the porous thin films used in the invention. For example, a glass substrate may have optical coating(s) disposed thereon, a semi-conducting silicon substrate may have electrical coating(s) disposed thereon, and the like. Substrates may be patterned (e.g., via etching, microtransfer printing, inkjet printing, etc.) or may be featureless. On a macroscopic scale, substrates may be flat such as in the case of glass panes, or may be curved (such as in lenses or glass spheres).

In some embodiments, the methods of interest involve contacting a surface of the porous thin film with a filling solution. The principle components of the filling solution include a reactive species which is discussed in more detail below. In some embodiments, the filling solution also comprises a solvent which is also discussed in more detail below. In some embodiments, the reactive species and solvent are present in predetermined amounts in order to optimize the filling, curing, and other methods as discussed herein. The filling solution is applied to the porous thin film in any convenient manner, such as spraying or pipetting the solution onto the film, or by immersing the substrate and film in bulk filling solution. Additional methods for applying the filling solution includes spin, rod, gravure, doctor blade application or curtain coating. In some embodiments, the filling solution is applied in excess, thereby necessitating methods for removal of excess solution (see below for further discussion of removal methods).

The solution characteristics of the filling solution may be selected in order to provide optimal interaction with the porous thin film. Without wishing to be bound by theory, optimal interaction occurs when the filing solution provides sufficient reactive species in a desirable period of time to partially or wholly fill the pores of the porous thin film. Solution characteristics such as pH, temperature, viscosity, concentration of reactive species, ionic strength, hydrophobicity and hydrophilicity, and the like are readily adjusted and tested (using the methods disclosed herein as well as those known in the art) to determine appropriate conditions that result in thin films with desired characteristics. For example, additives may be used for modifying the viscosity, surface tension, or other properties of the filling solution.

In some embodiments, for example, the pH of the filling solution will be less than 2.0, or less than 1.5, or less than 1.3. Also for example, the viscosity of the solution will be between 0.7 and 10 cp, or between 0.7 and 5 cp, or between 0.7 and 2 cp. Also for example, the concentration of $SiO_2$ (i.e. equivalent weight fraction of $SiO_2$) in the filling solution will be between 0.0001 and 0.5, including between 0.0001 and 0.1, or between 0.007 and 0.05.

In some embodiments, the pH of the filling solution is regulated by the addition of acid, base, or both (as in a buffered solution). For example, in some embodiments, an acid such as hydrochloric acid is added to the filling solution to lower the solution pH. This is particularly appropriate when orthosilicate materials are used as the reactive species (see below for further details).

The identity and characteristics of the filling solution may be selected based on a variety of factors. In some embodiments the identity of the substrate is one such factor. For example, to achieve maximum enhancement of film properties, silicate-based reactive species are typically selected when the porous thin films to be filled are disposed on glass substrates. This is due to the favorable chemical interaction of the filling solution with the chemical nature of the substrate. Similarly, acrylate-based reactive species are typically selected when the porous thin films to be filled are disposed on polymer substrates. Other factors such as solvent, pH, viscosity, etc. are easily modified as described herein in order to obtain filled films with desired properties. Another factor in selecting appropriate filling solutions is the morphology of the porous thin film.

In some embodiments, the reactive species is a compound that is capable of undergoing a self-condensation reaction with or without the application of an external stimulus. For example, the reactive species may be an orthosilicate compound (also referred to as a "silane" compound). Examples of orthosilicates include tetramethyl orthosilicate (TMOS), tetraethyl orthosilicate (TEOS), tetrapropyl orthosilicate, and the like. Fluorinated silanes, including fluorinated versions of these and other silanes are also suitable. Other silicon-containing, cross-linkable materials may be used in addition to or instead of orthosilicates. See, for example, the product catalog of Gelest, Inc., for further examples of crosslinkable materials.

In some embodiments, organic compounds such as crosslinkable acrylates may be used as the reactive species. For example, 2-hydroxyethyl acrylate (HEA), pentaerythritol triacrylate (PETA), 2-hydroxyethyl methacrylate (HEMA), trimethylolpropane triacrylate (TMPTA), 1,6-hexandiol diacrylate (HDDA) and the like may be used as reactive species. Furthermore, mixtures of acrylates may be used. See, for example, Hennink et al., *Adv. Drug Delivery Rev., vol.* 54, pp. 13-36, 2002 for further examples of crosslinkable materials. See, for example, the product catalog of Sartomer, Inc., for further examples of crosslinkable materials.

In some embodiments, the reactive species is a mixture of components that, when combined, form a cross-linked network with or without the application of an external stimulus. For example, epoxides and polyamines condense to form crosslinked epoxy polymers.

In some embodiments, combinations of the above-mentioned cross-linkable species are used. For example, a combination of an orthosilicate such as TEOS with an acrylate may be used in the filling solutions of the invention.

In some embodiments, the reactive formulation contains reactive titanium species. For example, the reactive species may be titanium isopropoxide.

In some embodiments, the reactive species is a sol-gel precursor compound. Examples of sol-gel precursors include titanium isopropoxide and TEOS, which are mentioned previously, as well as other precursors such as titania and silica intermediates (e.g., intermediate condensation products of orthosilicates and orthotitanates).

Depending on the identity of the reactive species, additional reactive species such as photoinitiators, thermal initiators (e.g., radical initiators) and other crosslinking agents (e.g., catalysts, triethylamine (TEA), ethylenediaminetetraacetic acid (EDTA), etc.) may be added to the filling solution. Examples of thermal initiators and photoinitiators are known and reported in the relevant art.

It will be appreciated that the reactive species can be used in an amount (e.g., as a concentration in the filling solution) that is predetermined, for example, to provide optimal pore filling or other optimal results using the methods disclosed herein. Furthermore, in some embodiments, the reactive species and other components of the filling solution (see below) is/are selected based on the identity of the substrate. Furthermore, in some embodiments, the reactive species and other components of the filling solution (see below) is/are selected based on the identity of the porous film.

Typically, the filling solution comprises a solvent as well as the reactive species. The solvent is selected so as to solubilize the reactive species and to regulate the interactions between the reactive species and the porous thin film. Thus, the choice of solvent significantly effects solution viscosity, hydrophobicity/hydrophilicity, and rate of evaporation, among other factors.

In some embodiments, the solvent is selected from polar, non-polar, protic, and polar aprotic solvents, or mixtures thereof. In some embodiments, the solvent is water. In some embodiments, the solvent is an organic water-miscible solvent such as an alcohol (e.g., ethanol, methanol, isopropanol, etc.), an ether (e.g., dimethyl ether), a sulfoxide (e.g., dimethyl sulfoxide), etc., or the solvent is selected from other nonpolar, protic and/or polar aprotic solvents. Dimethyl sulfoxide may be particularly desirable when high viscosity solutions are desired, or may be used as a viscosity modification agent in solutions using other solvents. In some embodiments, the solvent is a mixture of water and an organic solvent, such as water/ethanol or water/methanol. For example, the solvent may be water/ethanol in a ratio of between 1:1 and 100:1 (i.e., 100:1 water/ethanol or 1:100 water/ethanol). In some embodiments, no solvent is used in the filling solution, and the reactive species is applied "neat" (with or without additional, non-solvent additives as described herein).

Additional components that may be present in the filling solution include an acid, such as HCl, HBr, HI, and the like.

For example, in some embodiments, the filling solution comprises a mixture of ethanol, water, a silane, and hydrochloric acid, all in predetermined amounts. For example, the predetermined amounts (of this example or any other filling solution described herein) are matched to the morphology of the porous film. It will be appreciated that the porous film morphology is characterized, for example, by the volume fraction of pores, pore size, materials used in the preparation of the film (including, for example, the identity of the materials, the size and size distribution of nanoparticles when present, etc.), thickness of the film, etc.

In addition to the reactive species and solvent, the filling solution may contain additional agents for providing functionality to the film or otherwise enhancing the properties of the filled films. For example, rare earth metal salts and other metal salts (e.g., salts of Europium, Gadolinium, Erbium, Yttrium, Silver, etc.) added to the filling solution can result in films with light emission properties, which may be used in optical or energy applications. Such metal salt additives are referred to herein as dopants. Examples of such salts include gadolinium salts, erbium sulfate hydrate, erbium oxalate, etc. In some embodiments, for example, europium doped silica provides upconversion or downconversion (i.e., changing the wavelength of light that is passing through the coating). Such salts, in some embodiments, can be present in the filling solution prior to imbibition, and are thereby incorporated into the filled film.

Other chemicals suitable as additives include various organic or inorganic small molecules, organic dyes, pyrenes, and atoms deployed in vapor phase TEOS application processes such as boron, arsenic and phosphorous, and silver (e.g., to create antimicrobial coatings).

By the procedures mentioned above, a wide variety of chemicals that are soluble in the filling solution and that bring a particular functionality may be used in a method for adding functionality to the porous thin films. As such the film acts as a template, upon which functionality is added, while the uniformity of the porous thin film is maintained.

In some embodiments, an additional agent is added to affect a change in viscosity or surface tension of the filling solution. Such agents include thickeners, soaps, and other surface active compounds that are known in the art.

In some embodiments, and depending on the method used for curing (as discussed in more detail herein), additional additives may be present that facilitate the curing step. For example, in some embodiments, the filling solution contains a photoinitiator and/or a thermal initiator.

In some embodiments, the filling solution is applied to the porous film, and is allowed to remain in contact with the porous film for a predetermined period of time. The filling solution can be applied by any suitable means, such as via immersion, spray, spin, etc.

Without wishing to be bound by theory, it is believed that during the time that the filling solution is in contact with the porous thin film, reactive species imbibe into the pores of the film. In some embodiments, the filling solution (and therefore the reactive species) imbibes into at least a portion of the pores of the porous film. For example, the filling solution imbibes into at least 30%, or at least 40%, or at least 50%, or at least 60%, or at least 70%, or at least 80%, or at least 90% of the pores in the porous film. In some embodiments, the filling solution imbibes into substantially all of the pores of the porous film. It will be appreciated that, even when the filling solution has imbibed into a pore, the filling solution may not completely fill that pore (i.e., some air or other material may remain). Thus, in some embodiments, the at least a portion of the volume of the pores is filled by the filling solution, with such volume portion being at least 30%, or at least 40%, or at least 50%, or at least 60%, or at least 70%, or at least 80%, or at least 90%. In some embodiments, the filling solution completely fills the volume of pores in the porous film.

The imbibition step may be carried out for an appropriate amount of time, such time being dependent upon the size, number, and connectivity of pores in the porous thin film, the identity of the reactive species, the solution characteristics of the filling solution (e.g., pH, viscosity, surface tension, etc.), and similar variables. Typically, appropriate imbibition times are between 5 seconds and 1 hour. For example, imbibition times may be less than 30 min, or less than 10 min, or less than 5 min, or less than 2 min, or less than 1 min, or less than 30 seconds. Similarly, imbibition times may be greater than 5 seconds, or greater than 30 seconds, or greater than 1 min, or greater than 2 min, or greater than 5 min, or greater than 10 min, or greater than 30 min. In some embodiments, the porous film is evacuated (i.e., exposed to a low pressure environment) prior to or during imbibition of the filling solution. Alternatively or in addition, the porous film is subjected to higher atmospheric pressure during the filling. These methods create relatively lower pressure in the pores of the porous film (compared with the environment external to the porous film), which accelerates the imbibition process and/or maximizes the filling efficiency. Furthermore, subjecting the films to increased pressure reduces evaporation of the solvent of the filling solution during the imbibition process, and may be useful with highly volatile solvents.

In some embodiments, the imbibition process is carried out in the absence of an applied electromagnetic (EM) field. For example, no current is applied to the substrate or to the porous film, and no electrodes capable of creating an EM field are placed in the vicinity of the porous coating. In such embodiments, the filling solution imbibes into the porous film without the need for aid by an EM field.

After the filling solution is applied to the porous thin films, and after time is allotted for the imbibition step, but before any curing step is carried out (see below for a discussion of the curing step), the films are referred to herein as pre-cured films. Without wishing to be bound by theory, it is believed that the pre-cured films contain reactive species disposed within the pores and/or chemically or physically adsorbed to the pore walls. The pores of the pre-cured films may be completely filled with filling solution or may be only partially filled (with the remaining parts remaining as voids and comprising air or another gas). Furthermore the pores of the pre-cured films may comprise one or more of the components that differ from their respective concentrations in the filling solution. Thus, for example, the concentration of reactive species inside the pores of the pre-cured films may be higher than the concentration in the bulk filling solution. Such situations may occur when the reactive species has a higher affinity for imbibition into the pores compared with the solvent of the filling solution.

In some embodiments, after application of the filling solution to the porous thin film and after allowing the filling solution to remain in contact with the porous thin film for a suitable amount of time, it is desirable to remove excess filling solution from the pre-cured film. Removal of excess filling solution may be accomplished using a variety of methods. In some embodiments, excess filling solution is removed by application of a stream of gas to cause the solution to be blown from the surface. For example, a relatively high pressure stream of air, nitrogen, argon, or the like aimed at the solution on the surface can be used. The stream of gas can be provided via a nozzle or via multiple nozzles which may have any appropriate shape (e.g., conical, flat, etc.). In some embodiments, excess filling solution is removed by shaking, inverting, spinning, or otherwise mechanically moving the substrate. In such embodiments, forces such as gravity or centrifugal forces cause the excess filling solution to be removed. In some embodiments, excess filling solution is removed by wiping the surface with a cloth, rubber blade, or other wiping instrument. It will be appreciated that these methods of removing excess filling solution remove solvent as well as any other components that remains dissolved or suspended in the bulk filling solution (i.e., components that have not imbibed into the porous thin film).

Alternatively, some methods for removing excess filling solution remove only the solvent and other highly volatile components. In such embodiments, any molecules of reactive species that do not imbibe into the pores of the porous thin film are left on the surface of the filled thin film after removal of the excess filling solution. This may result in a coating of reactive species or other components from the filling solution disposed on the surface of the filled thin film. For example, in some embodiments, excess filling solution is removed by applying vacuum to cause rapid evaporation of the solution. In some embodiments, no positive actions are taken to remove excess filling solution, and the filling solution is simply allowed to dry under ambient conditions. When these approaches are used, and when the concentration of reactive species is too large, the filled films may crack and/or delaminate as the filling solution dries. Reducing the concentration of reactive species in the filling solution is one approach that is typically sufficient to avoid this outcome. In some embodiments it is desirable to control the excess solution remaining on the surface via a controlled removal process. In some embodiments it is desirable to allow excess solution on the surface to cure.

An example of an apparatus for removing excess filling solution is provided in FIG. 1. In FIG. 1, excess filling solution 100 is disposed on the porous film 103. The substrate 102 is set onto a translatable, movable stage 104. The stage is then moved past a fixed air flow device 105, wherein the excess filling solution is removed via air flow.

Without wishing to be bound by theory, it is believed that the reactive species imbibes into the pores of the porous thin films. After a suitable time has elapsed for the imbibition process, a curing step is carried out whereby the reactive species is reacted and undergoes a chemical change. For example, the reactive species undergoes a crosslinking reaction initiated by time, radiation, heat, or other environmental factors to form a continuous, covalently crosslinked network. Additional information regarding the curing is provided below.

As described above, in some embodiments it is necessary or desirable to employ a curing step after exposing the porous thin film to the filling solution. The curing step serves to modify the properties of the reactive species. In particular, during the curing step, the reactive species undergoes a chemical change. For example, in some embodiments the curing involves a condensation reaction or other reaction that results in crosslinking.

In some embodiments, the curing step merely involves providing sufficient time for the reactive species to react, but does not otherwise involve adding an external stimulus. In some embodiments, the curing step involves some form of externally-applied stimulus and/or a change in environmental conditions that encourages reaction of the reactive species. For example, the curing step may involve application of heat or electromagnetic radiation (e.g., microwave, UV, or visible light). Alternatively, the curing step may involve exposure to an activating solution, such as a low- or high-pH solution, or a solution containing a catalyst or additional reactants. Catalysts include acids and bases, but also include organic catalysts and metal catalysts such as are common in polymer crosslinking reactions.

When application of heat is used in the curing step, such heat is typically provided by placing the film into an oven at a temperature and for a time period sufficient to cause reaction of the reactive species. Thermal cycling, in which the temperature of the film is raised and lowered in cycles, may also be used in the curing step. Thermal curing is carried out at temperatures appropriate for the reactive species used in the formulation. For example, typical curing temperatures may be above 30° C., or above 50° C., or above 100° C., or above 150° C., or above 200° C., or above 250° C., or above 300° C., or above 400° C., or above 500° C.

Although full curing of the reactive species may take up to several hours or more, improvements in film properties are typically observed within a short time after beginning the curing step. For example, the time required for a thermal curing step to provide improved mechanical and environmental resistance may be between 1 minute and 1 hour, or between 5 min and 30 min. Full curing typically takes less than 24 hr, or less than 12 hr, or less than 4 hr, or less than 2 hr, or less than 1 hr.

As mentioned, in some embodiments the curing step does not involve providing any external stimulus. That is, some reactive species are able to self-condense and crosslink under ambient conditions (i.e., without application of heat, light, catalyst, etc.). For example, and without wishing to be bound by theory, it is believed that in some embodiments the concentration of reactive species within the film pores is greater than the concentration of reactive species in the bulk filling solution. The increase in concentration promotes crosslinking After the reactive species has reacted (thereby imparting the desired enhanced properties to the film), the modified films are referred to herein as "filled films." However, such nomenclature is not meant to be limiting in the sense that the pores of the porous thin film need not be completely filled— i.e., the pores may be only partially filled in the filled films. Filled films comprising pores that are completely filled with cross-linked reactive species (and optionally other components from the filling solution such as functional components) are embodiments of the invention. Other embodiments include filled films that retain some degree of porosity remaining. For example, the filled films may have porosities that range from 0.01 to 0.3 or greater. In some embodiments the filled films have a porosity that is less than 0.3, or less than 0.2, or less than 0.1, or less than 0.05, or less than 0.03, or less than 0.01.

In some embodiments, the filled films contain a crosslinked interpenetrating network of the reacted form of the reactive species within the pores of the porous film. The pores of the original porous film remain, but are filled (partially or completely) with the reacted form of the reactive species (e.g., silica, polyacrylate, etc.). Thus, although the porosity of the original porous film remains largely unchanged, the porosity of the composite film as a whole (i.e., the amount of void space in the porous film taken together with the interpenetrating network of crosslinked material) is reduced compared with the original porous film.

After the curing is complete, or toward the end of the curing step, the coating may be further processed to remove solvent and/or other additives introduced by the filling solution. For example, the coating can be blown dry with a stream of air or an inert gas. This process removes solvent that leftover from the filling solution, including some or all of the solvent that is located within the pores of the porous film.

Accordingly, in some embodiments, the methods of interest convert porous thin films into thin films having a reduced degree of porosity. For example, in some embodiments, the methods of interest provide three component thin films that are overall partially porous or completely non-porous. The first component comprises a first material having a first electrostatic charge. The second component comprises a second material having a second electrostatic charge. Typically, the first and second electrostatic charges are opposite charges. The first and second components together form a porous thin film (e.g., charged nanoparticles and polyelectrolytes that form bilayers). The third component comprises a third material and is a continuous and crosslinked material that partially or wholly fills the pores created by the other two components. In some embodiments the third material has the same chemical structure as either the first or second materials. For example, the first material may be silica nanoparticles, and the third material may be a crosslinked network of silicon dioxide. In such situations it will be appreciated that there may exist covalently linkages between the first material and the crosslinked network of the third material. It will further be appreciated that use of the terms "first" and "second" materials when applied to bilayers is not intended to imply any particular order—i.e., either the first or the second material may be closest to the substrate and/or may form the outermost layer (i.e., the surface) of the thin film. It will further be appreciated that, even when the three materials are different (e.g., have different chemical compositions), there may exist covalent linkages between the third material and the first material or between the third material and the second material.

In some embodiments, it is desirable to completely fill the pores of the porous thin film. By "completely fill" is meant that substantially no porosity remains in the filled films. This may be desirable when, for example, it is desired to make a high modulus coating such as an anti-scratch coating or a hard coating.

In some embodiments, although the pores of the porous thin film typically have an open pore structure, it is possible and desirable that the extent to which the filling material fills such pores varies with film depth. By the term "film depth" is meant the perpendicular distance beneath the surface of the film. Thus, for example, in some embodiments the outermost layers of the porous thin films (i.e., layers having the smallest film depth) are incompletely filled with crosslinked material from the filling solution, whereas layers at greater film depth have greater amounts of crosslinked material. In some embodiments, the pores closest to the substrate may be completely filled of crosslinked material, while the pores closest to the film surface are completely devoid with crosslinked material. It will be appreciated that the reverse of this previous statement can be created as well (i.e., greater extents of filling are found closer to the film's surface). Furthermore it will be appreciated that a single porous film may constitute multiple layers, and that different degrees of filling may be achieved in the different layers, dependent on the morphology, depth, and solution application or removal processes.

In some embodiments, it is desirable to have excess reactive species on the surface of the porous thin films. Typically this is achieved by using a solvent-only removal technique such as vacuum removal or evaporation when removing excess filling solution. The reactive species on the surface will also crosslink during the curing step, thereby forming a coating layer on the surface of the porous thin film. This may be desirable, for example, for putting a low index of refraction coating (e.g., a silica coating prepared by crosslinking TEOS) over a porous thin film having a higher index of refraction.

As described previously herein, properties of the porous thin films are determined by a number of factors (e.g., nanoparticle size and shape, polyelectrolyte material, etc.), and modifying such properties allows preparation of porous thin films with controlled properties. Similarly, properties of the filled films may be tuned by a number of factors employed in their preparation. Such factors include the solution properties of the filling solution, the curing step duration and method, the substrate, and the properties of the porous thin film.

In some embodiments, the filled films exhibit a significant enhancement in one or more of the following properties compared with the porous thin film: abrasion resistance; scratch resistance; environmental stability; mechanical durability; chemical stability, weatherability, fracture toughness; impact strength, hardness; modulus; etc. Furthermore, the refractive index of the filled film may be different from that of the porous thin film (i.e., prior to applying the filling solution). For example, the refractive index of the filled film may be greater than the refractive index of the porous thin film. In some embodiments, the percent transmittance of the filled films is similar to that of the parent porous thin film (i.e., prior to treatment with the filling solution). In some embodiments, the percent transmittance of the filled films is not less than 50%, or not less than 75%, or not less than 90%, or not less than 95%, or not less than 99% of the transmittance of the parent porous thin film.

In some embodiments, for example, the mechanical durability of the filled film is at least 25% greater, or at least 50% greater, or at least 75% greater than the durability of the porous film alone, as measured by cross hatched tape tests (ASTM Standard D3359) or by scratch displacements using nanoscratch testing (ASTM D1787). In some embodiments, for example, the refractive index of the filled film is at least 5% greater, or at least 10% greater, or at least 15% greater than the refractive index of the porous film alone. In some embodiments, for example, the abrasion resistance of the filled film is at least 25% greater, or at least 50% greater, or at least 75% greater than the abrasion resistance of the porous film alone, as measured by increased haze following linear or rotary abrasion testing (ASTM D1003). In some embodiments, for example, the hardness of the filled film (using the pencil hardness scale, i.e., 9B, 8B, 7B . . . B, HB, F, H . . . 7H, 8H, 9H) is at least 1 increments greater, or at least 2 increments greater, or at least 3 increments greater, or at least 4 increments greater, or at least 5 increments greater, or at least 6 increments greater than the hardness of the porous film alone. In some embodiments, for example, the modulus of the filled film is at least 10% greater, or at least 20% greater, or at least 50% greater than the modulus of the porous film alone, as measured by nanoindentation.

In some embodiments, the filling solution and curing process result in a more planar filled film compared with the porous film. The term "planar" refers to surface roughness, and in some embodiments the filled films of interest have highly planar surfaces. For example, the filled films of interest may have a surface roughness of less than about 25 nm, or less than about 15 nm, or less than about 10 nm, or less than about 5 nm. In some embodiments, the lack of surface roughness is an indication that little or no reactive species is present and crosslinks on the surface of the porous film (i.e., overfilled reactive material).

As mentioned previously, in some embodiments the crosslinked interpenetrating network does not completely fill the pores of the porous film. Thus, in such embodiments, the filled film maintains some percentage of pore volume that is not filled with the crosslinked interpenetrating network. Such "unfilled" volume can be filled with another substance such as air or another inert gas, or a liquid as desired. For example, in some embodiments, the filled film retains up to (but not more than) 10% of the pore volume of the initial porous film as unfilled volume, or up to 20%, or up to 30%, or up to 40%, or up to 50%, or up to 60%, or up to 75%, or up to 80%, or up to 90%, or up to 95%. In some embodiments, such volume represents a percentage of pores that are completely unfilled with the crosslinked interpenetrating network. In other embodiments, such percentage represents the percentage of each pore that remains unfilled by the interpenetrating network. In still other embodiments such percentage is a combination of completely unfilled pores and partially filled pores.

In some embodiments, after the curing, the thickness of the filled film (i.e., the porous film with crosslinked material) is not more than 2% greater, or not more than 5% greater, or not more than 10% greater than thickness of the porous film (i.e., the porous film prior to imbibition and curing). This includes any increases in thickness due to the presence of a coating of the crosslinked cured material on the surface of the porous film as well as any expansion of the porous film due to imbibition of the filling solution.

In some embodiments, the methods of interest provide thin films that have a number of advantages over unmodified films. For example, the improved properties mentioned above provide enhanced film performance in a variety of applications. Furthermore, the methods of the invention allow the formation of additional layers disposed on the surface of the thin film (e.g., by removing excess filling solution via vacuum). In some embodiments, the extent of crosslinking of the reactive species can be controlled by the intensity or duration of the curing step, thereby allowing fine tuning of the mechanical properties of the filled thin films. Furthermore, the methods allow the porous thin films to act as templates for the preparation of functionalized thin films, e.g., by including functional species in the filling solution. The methods are generally applicable to large area films as well as non-flat surfaces, as described herein.

In some embodiments, the methods and materials described herein are suitable for preparing antireflective coatings that have one or more improved properties over the coatings prepared via prior methods. For example, the antireflective coatings may have improved durability and/or strength.

In some embodiments, the methods are suitable for increasing the refractive index (RI) of a porous coating. For example, the RI of a porous coating comprising titania can be increased by using a filling solution containing TEOS. The TEOS displaces air from within the pores, and upon curing, forms silica within the pores. The silica material has a higher RI compared with air, and therefore increases the RI of the composite film (while simultaneously increasing strength in the titania coating).

The methods of the disclosure can be used to increase durability and strength of porous coatings in any application where such increases are desirable, and where the methods are compatible with the porous coating. Examples include optical films such as Bragg stacks, antireflective coatings, and dichroic minors. The methods and materials can also be used to eliminate the need for costly and complex procedures such as chemical vapor deposition in preparing high-performance films.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

EXAMPLES

Example 1

Preparation and Characterization of Porous Films

Porous films were assembled from solutions containing polydiallyldimethyl ammonium chloride (PDAC, 100-200,000 MW, Sigma Aldrich) and silicon dioxide nanoparticles ($SiO_2$, LUDOX® TM-50, WR Grace) using Layer by Layer spray deposition. An LbL spray deposition apparatus (modeled after the systems described in US Patent Application Publication No. US 2010/0003499 to Krogman et al., as well as Krogman et al., *Automated Process for Improved Uniformity and Versatility of Layer-by-Layer Deposition*, Langmuir 2007, 23, 3137-3141) was used to apply solutions directly to substrates. Films were deposited onto commercially available float glass (Asahi Glass Company). The resulting films exhibit a large degree of porosity, indicated by low reflectance. Using optical simulation software (TFCalc) to match experimentally determined reflectance curves, the refractive index of a film was determined to be 1.26. The ultra low refractive index is indicative of the presence of air in the film and corresponds directly to porosity.

Example 2

Backfilling of Porous Films

A reactive formulation containing tetraethoxyorthosilane (TEOS, Sigma-Aldrich), ethanol, deionized water (18 megaohm) and hydrochloric acid was prepared. The solvent was prepared by stirring DI water and adding dropwise 6M solution of hydrochloric acid in a glass bottle to a measured pH of 1.0. Then, 1.44 grams of ethanol was added for each gram of water. This bottle was then sealed, shaken aggressively, and allowed to rest overnight.

Some of this solution was then used as is (Formulation #3). The remainder of the solution was further diluted with ethanol to a desired concentration of TEOS. Two prepared solutions were diluted to ratios of 0.39:1 (Formulation #1) and 1.5:1 (Formulation #2) ratios with ethanol.

These solutions were applied dropwise to 6"×6" samples of the porous film from Example 1, facing up. Approximately 3 milliliters of the solution was applied to the surface and examined to ensure that the entire porous thin film was covered. When applied correctly a thin pool of fluid remains on the surface. An incubation time of more than five seconds and less than 5 minutes was allowed to pass prior to the removal of excess fluid on top of the porous film. The apparatus shown in FIG. 1 was designed and constructed to use controlled, directed air flow to blow off excess fluid. The movable stage supporting the substrate was translated past an air knife, which resulted in the removal of all surface liquid.

The samples were then placed in a furnace at 450° C. for 30 min, removed and allowed to cool to room temperature. This step serves to drive the silicon dioxide condensation reaction.

Example 3

Characterization of Modified Porous Films

The samples prepared in Example 2 were subjected to a variety of testing methods. Reflectance curves were obtained using a contact UV-Vis reflectance system (F-10, Filmetrics) and transmission and haze measurements were obtained using a Hazegard (BYK). Improvement in mechanical strength was measured via test method ASTM D1003-07 for abrasion resistance. Untreated and treated porous films were subjected to abrasion via oscillation by 0000 steel wool weighted at 1100 g per square inch past the sample (Linear Abraser, Taber Industries) with transmission, haze and reflectance measurements measured after a certain number of abrasion oscillations.

The results for a 70 nm thick porous film are shown in Table 1. The increase in transmission (% T), compared with that of bare glass with no film, is due to the anti-reflective nature of the porous thin film. The % haze, typically less than 0.4%, following treatment with the reactive formulation, is indicative that no excess formulation remains on the surface which can lead to surface roughness, non-uniformity and more haze. The use of the reactive formulations decreases the % T compared with the untreated film, reflecting a change in the refractive index and a corresponding decrease in the porosity. Following 10 oscillations of abrasion with steel wool, the % T decreases as the film is abraded away. Without treatment with the reactive formulation, the % T is reduced to that of bare glass and % haze remains the same, indicating the removal of the entire film. For films that have been treated with the reactive formulations, the % T is reduced, but not to the extent that is observed without treatment, indicating the presence of the porous film remaining on the surface. The % haze is increased, though also not to a significant extent (a value of <1% is considered very good). The increase in haze may be due to presence of microscratches that are too small to observe visually but cause off-angle scatter. The results for the different formulations, which contain increasing concentrations of TEOS, show that higher concentrations of TEOS provide better ability to protect the porous film from being abraded. However it is also observed that the higher concentrations of TEOS more significantly reduce the % T, leading to less desirable optical properties, consistent with a greater degree of filling. Optimum formulations are accordingly selected based on the desired degree of porosity and abrasion strength.

TABLE 1

Characterization data for treated and untreated porous films

| Formulation # | no abrasion | | after 10 oscillations | | Change | |
|---|---|---|---|---|---|---|
| | % T | % haze | % T | % haze | % T | % haze |
| none | 95.4 | 0.1 | 92.8 | 0.1 | −2.6 | 0.0 |
| 1 | 94.8 | 0.2 | 94.1 | 0.5 | −0.7 | 0.4 |
| 2 | 93.6 | 0.2 | 93.0 | 0.4 | −0.6 | 0.2 |
| 3 | 93.8 | 0.2 | 93.6 | 0.4 | −0 2 | 0.2 |
| bore glass with no film | 92.8 | 0.3 | 92.7 | 0.2 | −0.1 | −0.1 |

Example 4

Characterization of Modified Porous Films

Thicker porous films (140 nm thick), containing PDAC and $SiO_2$ were prepared via the layer by layer spray deposition process onto float glass. The films were treated and characterized as described in Examples 2 and 3 using two of the formulations detailed in Example 2. Results from abrasion tests are shown in Table 2. In this case, treatment with Formulation #1 was insufficient to prevent substantial decrease in % T and increase in % haze. However Formulation #2 was sufficient to reduce the amount of % T loss and % haze increase. Optimum formulations are accordingly selected based on the thickness of the porous film. The results from this example indicate that, by changing the film thickness, a different formulation may be used to sufficiently reinforce the porous film.

TABLE 2

Characterization data for treated and untreated porous films

| Formulation # | no abrasion | | after 10 oscillations | | Change | |
|---|---|---|---|---|---|---|
| | % T | % haze | % T | % haze | % T | % haze |
| none | 95.8 | 0.2 | 92.8 | 0.1 | −3.0 | −0.1 |
| 1 | 95.6 | 0.1 | 92.3 | 3.9 | −3.3 | 3.7 |
| 2 | 94.7 | 0.2 | 93.5 | 0.4 | −1.2 | 0.2 |
| bore glass with no film | 92.8 | 0.3 | 92.7 | 0.2 | −0.1 | −0.1 |

Example 5

Preparation and Characterization of Titania-Based Porous Films

Porous films were assembled from solutions containing PDAC and titanium dioxide nanoparticles ($TiO_2$, Photocatalyst sol X-500, Titan PE) using Layer by Layer Assembly spray deposition. An LbL spray deposition apparatus (modeled after the systems described in US Patent Application Publication No. US 2010/0003499 to Krogman et al., as well as Krogman et al., *Automated Process for Improved Uniformity and Versatility of Layer-by-Layer Deposition, Langmuir* 2007, 23, 3137-3141) was used to apply solutions directly to substrates. The $TiO_2$ based films also exhibit a high degree of porosity, though due the high refractive index of $TiO_2$, the films correspondingly exhibit higher refractive indices as well. Modeling the measured reflectance curves results in film refractive indices of 1.82. These films were subjected to the same reactive formulations, thermal treatment and abrasion tests detailed in Examples 2 and 3. The results are shown in Table 3. In contrast to $PDAC/SiO_2$ based films, the $PDAC/TiO_2$ films are reflective in nature, resulting in decreased % T when the film is present on the surface. The results seem consistent with the trends observed for $PDAC/SiO_2$ films in that increasing concentrations of TEOS appear to mitigate the loss of % T, with no visible presence of scratches. While the % haze increases, this change is well within measurement error. The reactive formulation was therefore generally applicable to films with different chemical makeup.

TABLE 3

Characterization data for treated and untreated porous films

| Formulation # | no abrasion | | after 10 oscillations | | Change | |
|---|---|---|---|---|---|---|
| | % T | % haze | % T | % haze | % T | % haze |
| none | 92.0 | 0.3 | 92.8 | 0.2 | 0.8 | −0.1 |
| 1 | 90.3 | 0.2 | 89.9 | 0.2 | −0.4 | 0.0 |
| 2 | 89.3 | 0.4 | 89.2 | 0.5 | −0.1 | 0.1 |
| 3 | 89.0 | 0.2 | 89.0 | 0.4 | 0.0 | 0.2 |

Example 6

Preparation and Characterization of Heat Treated Titania Porous Films

Porous films were assembled from solutions containing PDAC and titanium dioxide nanoparticles ($TiO_2$, Photocatalyst sol X-500, Titan PE) using Layer by Layer Assembly spray deposition. Prior to the reactive formulation treatment of these films, samples were placed in a furnace at 450 degrees Celsius for 30 minutes and allowed to cool to room temperature. This thermal treatment resulted in the removal of the organic species from the film and a corresponding decrease in the film thickness. After this thermal treatment, Formulation #1 was applied to the films, as described in Example 2. Films that underwent the initial thermal treatment show better abrasion resistance for thicker films, as measured by small changes in % Haze. While visible scratches were visible for both of the thickest treated films, the thermally treated film exhibit far fewer scratches, corroborating the % haze results. Accordingly optimum formulations are available based on pre-treatments and their corresponding change in chemical makeup, morphology and thickness of the film.

TABLE 4

Characterization data for pretreated porous films

| | thermal treatment | | | | | |
| --- | --- | --- | --- | --- | --- | --- |
| | no abrasion | | abrasion | | Change | |
| Thickness | % T | % haze | % T | % haze | % T | % haze |
| 29 | 90.5 | 0.2 | 90.0 | 0.4 | −0.5 | 0.2 |
| 58 | 84.3 | 0.2 | 83.4 | 0.4 | −0.9 | 0.2 |
| 115 | 83.7 | 0.3 | 80.3 | 0.6 | −3.4 | 0.3 |
| 180 | 91.6 | 0.4 | 88.7 | 1.3 | −2.9 | 1.0 |

| | no thermal treatment | | | | | |
| --- | --- | --- | --- | --- | --- | --- |
| | no abrasion | | abrasion | | Change | |
| Thickness | % T | % haze | % T | % haze | % T | % haze |
| 32 | 90.3 | 0.2 | 89.9 | 0.3 | −0.4 | 0.1 |
| 64 | 83.7 | 0.2 | 83.1 | 0.4 | −0.6 | 0.1 |
| 128 | 82.5 | 0.4 | 89.0 | 6.6 | 6.5 | 6.2 |
| 200 | 91.7 | 0.4 | 90.2 | 8.0 | −1.5 | 7.5 |
| bore glass with no film | 92.8 | 0.3 | 92.7 | 0.2 | −0.1 | −0.1 |

Example 7

Preparation of Porous Films on Various Substrates

Porous films were assembled form solutions containing PDAC and $SiO_2$ nanoparticles using Layer by Layer spray assembly deposition onto glass and plastic substrate (Lexan, polycarbonate, Sabic). A reactive formulation consisting of 9:1 hydroxyethylacrylate and 1,6-Hexanediol diacrylate was allowed to imbibe into this porous film on polycarbonate. Removal of excess solution was facilitated by air flow using a hand held air-gun. The film was then exposed to a UV radiation source and allowed to cure. Upon qualitative comparison via a finger nail scratch test, the filled film exhibited better scratch resistance compared with a control film. Modifications of this process can include dilution of the reactive formulation with ethanol to decrease the viscosity, modification of the ratios of acrylates, and the use of other multi-functional acrylates such as trimethylolpropane triacrylate.

Example 8

Preparation and Characterization of Filled Porous Films with Additives

Porous thin films are assembled from solutions using Layer by Layer Assembly deposition onto glass and plastic substrate. A reactive formulation containing TEOS, one or more metal salt (such as Lutetium Nitrate, Europium Chloride, Neodymium Sulfate Hydrate, or Erbium oxalate, Silver Nitrate, among others), water, ethanol and hydrochloric acid is used in the process described in Example 2-3. The concentration of the rare earth metal salt is adjusted to achieve ideal concentrations. The result of this process is a porous thin film with some porosity replaced by a rigid continuous network of rare earth metal salt doped silica. Furthermore, these films have additional functionality. For example, use of the rare earth metal salt Lutetium Nitrate in the reactive formulation enables a porous film to have light "up-conversion" properties. Lu-doped silica absorbs energy in the infrared and re-emits radiation at a shorter wavelength, for example in the visible portion of the spectrum. Also for example, use of silver nitrate in the reactive formulation enables a porous film to have anti-microbial properties. The addition of a fluorinated silane (perfluorosilane) in the reactive formulation imparts a degree of hydrophobicity to a treated porous film. Superhydrophobicity is achieved through the use of fluorinated silanes and porous films that exhibit multi-scale roughness.

Example 9

Preparation of Filled Films Using Spray Deposition of the Filling Solution

An alternative method of applying the filling solution is the use of spray based deposition. This method was demonstrated using a filling solution containing TEOS, wherein the filling solution was sprayed onto a porous film assembled from PDAC and silicon dioxide (HS-30, LUDOX®, WR Grace). A formulation consisting of ethanol, water and TEOS, with the pH adjusted to 1.0, was sprayed onto the surface of the porous film using a hand-held air brush (Badger 200). The solution was allowed to imbibe into the film for several seconds prior to air flow removal of excess solution. Following thermal treatment at 260 degrees Celsius for one hour, the optical properties indicated a slight decrease in transmission, suggesting the presence of a condensed silica phase, indicating successful pore filling upon spray based application. In addition to the standard advantages of spray based processing (which include economic, manufacturing throughput and scalability considerations), it was noted that spray based deployment of reactive formulations can allow for "on-the-fly" deployment of reactive formulations during the layer by layer deposition process.

What is claimed is:

1. A method for modifying a property of a porous thin layer-by-layer (LbL) film less than 10 μm thick, disposed on a substrate, and comprising an inorganic material in the form of charged nanoparticles, a polymer polyelectrolyte, and an interconnected network of open pores filled with ambient gas, the method comprising:

applying a filling solution comprising a reactive species and optionally a solvent to the surface of the film;

allowing the filling solution to remain in contact with the surface of the film for a period of time between 5 seconds and 1 hour and sufficient to allow the reactive species to be imbibed into the pores;

removing excess filling solution from the surface of the film; and thereafter crosslinking the reactive species imbibed in the pores to form a crosslinked network within the pores.

2. The method of claim 1 wherein the crosslinking is effected by applying a crosslinking stimulus to the film sufficient to cause initiation of crosslinking, and the stimulus is heat.

3. The method of claim 1 wherein the crosslinking is effected by allowing sufficient time for auto-initiation of crosslinking.

4. The method of claim 1 wherein the excess filling solution is removed with a stream of gas.

5. The method of claim 1, wherein the inorganic material is selected from metal oxides, metal nitrides, metal sulfides, metals, quantum dots, graphene, carbon nanotubes, and combinations thereof.

6. The method of claim 1, wherein the inorganic material is a metal oxide selected from titanium dioxide, silicon dioxide, cerium dioxide, tin oxide and zirconium oxide.

7. The method of claim 1, wherein the polyelectrolyte is selected from poly(diallyldimethylammonium chloride) (PDAC), poly(allylamine hydrochloride) (PAH), poly(sulfonated styrene) (PSS), poly(acrylic acid) (PAA), poly(ethylene imine), poly(vinyl alcohol), poly(ethylene oxide), polythiophenes, and copolymers thereof.

8. The method of claim 1 wherein the polyelectrolyte is a biologically derived polyelectrolyte selected from chitosan, carboxymethylcellulose, polysaccharides, hyaluronic acid, and copolymers thereof.

9. The method of claim 1, wherein the reactive species is an orthosilicate selected from tetramethyl orthosilicate (TMOS), tetraethyl orthosilicate (TEOS), and tetrapropyl orthosilicate.

10. The method of claim 1 wherein the reactive species is a crosslinkable acrylate selected from 2-hydroxyethyl acrylate (HEA), pentaerythritol triacrylate (PETA), 2-hydroxyethyl methacrylate (HEMA), trimethylolpropane triacrylate (TMPTA), and 1,6-hexandiol diacrylate (HDDA).

11. The method of claim 1 wherein the inorganic material is silicon dioxide or titanium dioxide, the polyelectrolyte is poly(diallyldimethylammonium chloride) (PDAC), and the reactive species is tetraethyl orthosilicate (TEOS).

12. The method of claim 1 wherein the period of time is less than 5 minutes.

13. The method of claim 1, wherein the filling solution has a pH below 2.0.

14. The method of claim 1 wherein the filling solution is applied by spraying the filling solution onto the surface of the film.

15. The method of claim 1 wherein the substrate is glass or plastic.

16. The method of claim 1 wherein the inorganic material is silicon dioxide or titanium dioxide, the polyelectrolyte is poly(diallyldimethylammonium chloride) (PDAC), the reactive species is tetraethyl orthosilicate (TEOS), the excess filling solution is removed with a stream of gas, the period of time is less than 5 minutes, the filling solution has a pH below 2.0, and the crosslinking stimulus is applied to the film, the stimulus is heat.

17. The method of claim 1 further comprising prior to applying the filling solution heating the film to a temperature sufficient to pyrolyze the polyelectrolyte, but insufficient to sinter the inorganic material.

18. The method of claim 17 wherein the crosslinking is effected by applying a crosslinking stimulus to the film sufficient to cause initiation of crosslinking, and the stimulus is heat.

19. The method of claim 17 wherein the excess filling solution is removed with a stream of gas.

20. The method of claim 17, wherein the inorganic material is a metal oxide selected from titanium dioxide, silicon dioxide, cerium dioxide, tin oxide and zirconium oxide.

21. The method of claim 17, wherein the polyelectrolyte is selected from poly(diallyldimethylammonium chloride) (PDAC), poly(allylamine hydrochloride) (PAH), poly(sulfonated styrene) (PSS), poly(acrylic acid) (PAA), poly(ethylene imine), poly(vinyl alcohol), poly(ethylene oxide), polythiophenes, Nafion, and copolymers thereof.

22. The method of claim 17, wherein the reactive species is an orthosilicate selected from tetramethyl orthosilicate (TMOS), tetraethyl orthosilicate (TEOS), and tetrapropyl orthosilicate.

23. The method of claim 17 wherein the inorganic material is silicon dioxide or titanium dioxide, the polyelectrolyte is poly(diallyldimethylammonium chloride) (PDAC), and the reactive species is tetraethyl orthosilicate (TEOS).

24. The method of claim 17 wherein the inorganic material is silicon dioxide or titanium dioxide, the polyelectrolyte is poly(diallyldimethylammonium chloride) (PDAC), the reactive species is tetraethyl orthosilicate (TEOS), the excess filling solution is removed with a stream of gas, the period of time is less than 5 minutes, the filling solution has a pH below 2.0, the crosslinking stimulus is applied to the film, and the stimulus is heat.

* * * * *